Patented Dec. 5, 1944

2,364,200

UNITED STATES PATENT OFFICE 2,364,200

PREPARATION OF DIAMIDINO-STILBENES

Arthur James Ewins, Romford, and Julius Nicholson Ashley, Upminster, England, assignors to May & Baker Limited, Dagenham, England, a company of Great Britain No Drawing. Application November 26, 1941, Serial No. 420,494

In Great Britain December 9, 1940

3 Claims. (Cl. 260—564)

The present invention relates to the preparation of therapeutically valuable stilbene derivatives and in particular to a modification of the process claimed in our U. S. A. Patent No. 2,204,983.

U. S. A. Patent No. 2,204,983 claims the preparation of amidine derivatives of the stilbene series of the type Am.B.CH=CH.B.Am. in which Am. represents the amidine group and B represents a benzenoid nucleus, by treating dicyano compounds of the stilbene series with anhydrous alcoholic hydrogen chloride or hydrogen bromide whereby the corresponding imino-ethers are formed which are then treated with ammonia or salts thereof whereby they are converted into the amidines.

It has now been found that these diamidino-stilbenes can also be prepared from the corresponding nitriles by the direct action of an alkali metal amide.

According to the present invention, therefore, a process for the preparation of an amidine derivative of the stilbene series having the general formula: Am.B.CH=CH.B.Am. wherein Am. represents the amidine group and B represents a benzenoid nucleus (preferably a benzene nucleus), consists in reacting the corresponding nitrile of the general formula:

CN.B.CH=CH.B.CN with an alkali metal amide and liberating the free diamidino-stilbene from its alkali metal compound thus formed.

The reaction is illustrated by the following scheme:

2NaNH₂+CNC₆H₄CH:CHC₆H₄CN ⟶

2HCl ⟶
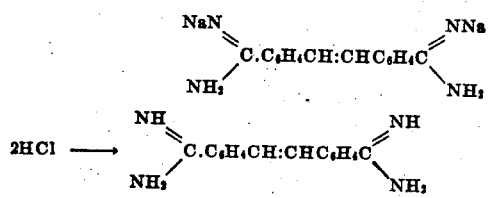

The first stage of the reaction is preferably carried out by heating the reactants together in the presence of inert solvents such as xylene, toluene, anisole, phenetole or diphenyl. An alternative, though less preferred, method consists in effecting reaction at low temperatures using liquid ammonia as a solvent medium. The second stage of the reaction may be effected by treating the alkali metal compound (product of stage 1) with dilute acid until just acid in reaction and isolating the free diamidino stilbene, from the solution of its salt thus formed, by precipitation with excess of caustic alkali.

This invention is illustrated by the following example:

Example

A hot solution of 10 grm. of 4:4′-dicyano-stilbene in 110 cc. of anisole was boiled under a reflux with 4.2 grm. of finely powdered sodamide for 6 hours. After cooling, the mixture was filtered, and the residue after being washed with ether was treated with dilute hydrochloric acid until acid in reaction. The mixture was then boiled and filtered. Addition of concentrated hydrochloric acid to the filtrate precipitated 4:4′-diamidinostilbene dihydrochloride. It crystallised from dilute hydrochloric acid in almost colourless needles. (M. Pt. about 300° C.) The free diamidino-stilbene was obtained from the product by treatment with alkali.

We claim:

1. Process for the production of an amidine derivative of the type Am.B.CH=CH.B.Am. in which Am. represents the amidine group and B represents a benzene nucleus, comprising reacting a nitrile of the type CN.B.CH=CH.B.CN with an alkali metal amide under heat in the presence of an inert organic solvent, filtering the resulting mixture, washing the residue with ether, acidifying the residue with dilute hydrochloric acid, boiling and filtering the resulting mixture, adding concentrated hydrochloric acid to the filtrate to precipitate the dihydrochloride of the amidine derivative of the said type, and isolating the free amidine derivative of the type Am.B.CH=CH.B.Am from the solution of its salt thus formed, by precipitation with caustic alkali.

2. Process for the production of 4,4′-diamidino-stilbene comprising heating 4:4′-dicyano-stilbene with sodamide in the presence of an inert organic solvent, filtering the resulting mixture, washing the residue with ether, acidifying the residue with dilute hydrochloric acid, boiling and filtering the resulting mixture, adding concentrated hydrochloric acid to the filtrate to precipitate 4:4′-diamidino-stilbene dihydrochloride, and isolating the free 4,4′-diamidino-stilbene, from the solution of its dihydrochloride, by precipitation with alkali.

3. In a process according to claim 1 for the production of an amidine derivative of the type Am.B.CH=CH.B.Am., in which Am. represents the amidine group and B represents a benzene nucleus, the step of reacting a nitrile of the type CN.B.CH=CH.B.CN with an alkali metal amide under heat in the presence of an inert organic solvent.

ARTHUR JAMES EWINS.
JULIUS NICHOLSON ASHLEY.